(12) United States Patent
Schumann

(10) Patent No.: US 11,500,190 B2
(45) Date of Patent: Nov. 15, 2022

(54) OBLIQUE PLANE MICROSCOPE

(71) Applicant: Leica Microsystems CMS GmbH, Wetzlar (DE)

(72) Inventor: Christian Schumann, Lich (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 796 days.

(21) Appl. No.: 16/340,140

(22) PCT Filed: Oct. 6, 2017

(86) PCT No.: PCT/EP2017/075447
§ 371 (c)(1),
(2) Date: Apr. 8, 2019

(87) PCT Pub. No.: WO2018/069170
PCT Pub. Date: Apr. 19, 2018

(65) Prior Publication Data
US 2019/0243118 A1    Aug. 8, 2019

(30) Foreign Application Priority Data

Oct. 10, 2016    (DE) .................... 10 2016 119 268.6

(51) Int. Cl.
G02B 21/36    (2006.01)
G02B 21/00    (2006.01)
G01N 21/64    (2006.01)

(52) U.S. Cl.
CPC ....... *G02B 21/361* (2013.01); *G01N 21/6458* (2013.01); *G02B 21/0032* (2013.01); *G02B 21/0076* (2013.01); *G02B 21/367* (2013.01)

(58) Field of Classification Search
CPC .............. G02B 21/361; G02B 21/0032; G02B 21/0076; G02B 21/367; G01N 21/6458
(Continued)

(56) References Cited

U.S. PATENT DOCUMENTS 4,872,747 A * 10/1989 Jalkio .................... G01B 11/00
359/669
8,582,203 B2 * 11/2013 Dunsby .................. G02B 21/16
359/368
(Continued)

FOREIGN PATENT DOCUMENTS

CN    103743714 A    4/2014
CN    104428706 A    3/2015
(Continued)

*Primary Examiner* — William R Alexander
*Assistant Examiner* — Rahman Abdur
(74) *Attorney, Agent, or Firm* — Leydig, Voit & Mayer, Ltd.

(57) ABSTRACT

An oblique plane microscope includes a detection optical unit having an image sensor which has a sensor surface formed from sensor lines arranged in parallel, and a transport optical unit having an objective arranged for specimen illumination by a light sheet tilted relative to an optical axis of the transport optical unit and for imaging a specimen plane illuminated with the light sheet onto the sensor surface. An optical axis of the detection optical unit is tilted relative to the optical axis of the transport optical unit. The sensor lines each extend in an orthogonal direction with respect to the optical axis of the transport optical unit. The detection optical unit has an anamorphic magnification system. A magnification of an anamorphic magnification system of the detection optical unit, in a direction lying orthogonal to the sensor lines, is less than in a direction lying parallel to the sensor lines.

14 Claims, 5 Drawing Sheets

(58) Field of Classification Search
USPC .......................................................... 359/385
See application file for complete search history.

(56) References Cited

U.S. PATENT DOCUMENTS

| | | | |
|---|---|---|---|
| 9,030,734 B2 | 5/2015 | Knebel et al. | |
| 2007/0114362 A1* | 5/2007 | Feng | G01N 21/6452 |
| | | | 250/208.1 |
| 2010/0220315 A1 | 9/2010 | Morrell et al. | |
| 2011/0031414 A1 | 2/2011 | Lippert et al. | |
| 2012/0206798 A1* | 8/2012 | Knop | G02B 21/06 |
| | | | 359/385 |
| 2013/0016346 A1 | 1/2013 | Romanovsky et al. | |
| 2014/0136132 A1* | 5/2014 | Maekawa | H01M 10/052 |
| | | | 702/63 |
| 2015/0168732 A1 | 6/2015 | Singer et al. | |
| 2015/0182118 A1* | 7/2015 | Bradbury | A61B 1/00006 |
| | | | 600/431 |
| 2015/0226670 A1 | 8/2015 | Kleppe et al. | |
| 2015/0362713 A1 | 12/2015 | Betzig et al. | |

FOREIGN PATENT DOCUMENTS

| | | |
|---|---|---|
| CN | 105300941 A | 2/2016 |
| DE | 102011000835 A1 | 8/2012 |
| JP | H04-320907 A | 11/1992 |
| JP | H05-091514 A | 4/1993 |
| JP | H07-294827 A | 11/1995 |
| JP | H10-213743 A | 8/1998 |
| JP | 2000-249919 A | 9/2000 |
| JP | 2012-519278 A | 8/2012 |
| JP | 2014-524033 A | 9/2014 |
| JP | 2015-523602 A | 8/2015 |
| JP | 2015-175737 A | 10/2015 |
| WO | WO 2009124700 A1 | 10/2009 |
| WO | WO 2010012980 A1 | 2/2010 |
| WO | WO 2015109323 A2 | 7/2015 |
| WO | WO 2016054474 A1 | 4/2016 |
| WO | WO 2016154729 A1 | 10/2016 |
| WO | WO 2017210159 A1 | 12/2017 |

* cited by examiner

OBLIQUE PLANE MICROSCOPE

CROSS-REFERENCE TO PRIOR APPLICATIONS

This application is a U.S. National Stage Application under 35 U.S.C. § 371 of International Application No. PCT/EP2017/075447 filed on Oct. 6, 2017, and claims benefit to German Patent Application No. DE 10 2016 119 268.6 filed on Oct. 10, 2016. The International Application was published in German on Apr. 19, 2018, as WO 2018/069170 A1 under PCT Article 21(2).

FIELD

The invention relates to an oblique plane microscope, comprising a detection optical unit having an image sensor, which has a sensor surface formed from a plurality of sensor lines arranged parallel to one another, and a transport optical unit with a specimen-facing objective, which is provided both for specimen illumination by means of a light sheet tilted in relation to the optical axis of the transport optical unit and for imaging a specimen plane illuminated with the light sheet onto the sensor surface of the image sensor, wherein the optical axis of the detection optical unit is tilted in relation to the optical axis of the transport optical unit.

BACKGROUND

Conventional light sheet microscopes have two separate objectives on the specimen side, of which one is used for illumination and the other for detection. By means of the illumination objective, a light sheet oriented parallel to the optical axis is usually focused into the specimen; the illuminated region of the specimen is then imaged onto a detector by the detection objective, the optical axis of which lies perpendicular to the optical axis of the illumination objective. For applications in which imaging of the specimen by means of such a light sheet microscope equipped with two separate objectives is not possible due to lack of space, U.S. Pat. No. 8,582,203 B2 proposes a microscope with a single objective, which is used on the specimen side. The light sheet in this microscope is focused into the specimen in such a way that it is inclined with respect to the optical axis of the objective. Because of this inclination, such a microscope is characterized as an oblique plane microscope (OPM).

Since the oblique plane microscope known from the prior art has only a single specimen-facing objective, it enables access to the fluorescence-based microscopic light sheet imaging in specimens, the imaging of which is not possible by means of a conventional light sheet microscope with two objectives. As an essential component, it contains a so-called transport optical unit, which is used for volumetric imaging. This transport optical device is a 4f system or double-sided telecentric imaging system, the magnification of which must correspond to the refractive index ratio between the specimen image and the intermediate image, to also ensure correct depiction of the aperture angle. If the requirements of double-sided telecentricity and the aforementioned magnification adaptation are fulfilled, then transport of a volumetric image between the specimen space and intermediate image space is possible in the same manner. On the other hand, only the transport of a planar image is carried out in a conventional microscope, in which one of the two above-mentioned requirements is not fulfilled.

With an oblique plane microscope of the previously explained type, the detection optical unit containing the image sensor is tilted in relation to the transport optical unit. This means that the optical axes of the detection optical unit and the transport optical unit are tilted relative to each other. Accordingly, the image sensor of the detection optical unit is also aligned to be tilted relative to the optical axis of the transport optical unit.

SUMMARY

In an embodiment, the present invention provides an oblique plane microscope. The oblique plane microscope includes a detection optical unit having an image sensor which has a sensor surface formed from a plurality of sensor lines arranged parallel to one another, and a transport optical unit having a specimen-facing objective which is arranged both for specimen illumination by a light sheet tilted relative to an optical axis of the transport optical unit and for imaging a specimen plane illuminated with the light sheet onto the sensor surface of the image sensor. An optical axis of the detection optical unit is tilted with respect to the optical axis of the transport optical unit. The sensor lines each extend in an orthogonal direction with respect to the optical axis of the transport optical unit. The detection optical unit has an anamorphic magnification system. A magnification of the anamorphic magnification system, in a direction lying orthogonal to the sensor lines of the image sensor, is less than a magnification of the anamorphic magnification system in a direction lying parallel to the sensor lines of the image sensor.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
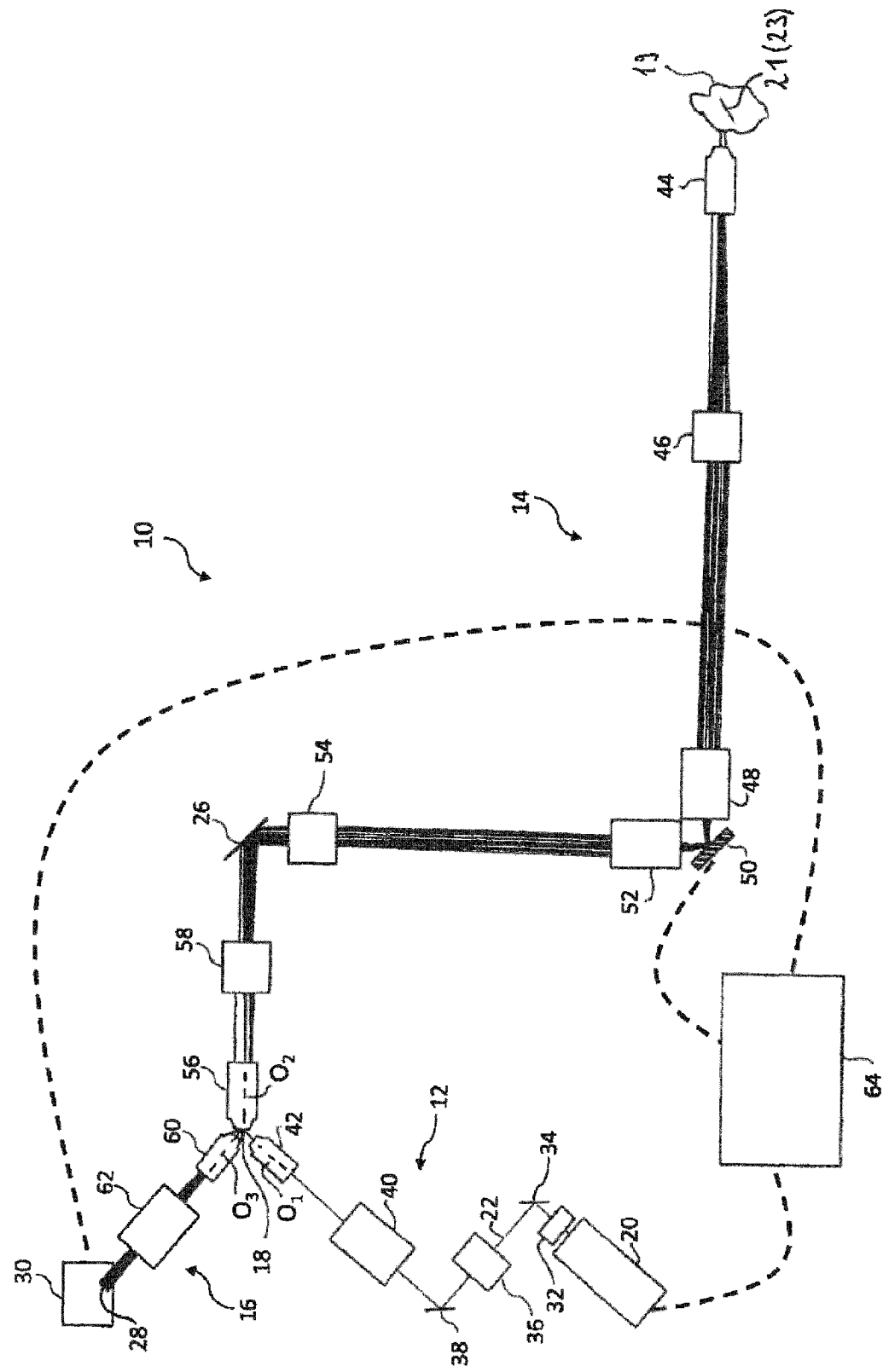
FIG. 1 shows the schematic configuration of an oblique plane microscope as an exemplary embodiment.

Particularly in scientific microscopy applications, especially high-quality image sensors such as so-called sCMOS sensors (scientific CMOS) are particularly characterized by a high resolution, high frame rate, low readout noise, and high dynamics. Moreover, such sCMOS sensors have the property that the time required for reading out the image signals depends essentially solely upon the number of sensor lines forming the sensor surface, while the number of sensor columns read out with these lines is irrelevant for the duration of the read-out process. Especially with regard to the fastest possible image acquisition, it has been recognized in accordance with an embodiment of the present invention that the use of such image sensors is also particularly advantageous in oblique plane microscopy.

An embodiment of the present invention provides an oblique plane microscope of the aforementioned type in such a way that it enables especially fast image acquisition.

The oblique plane microscope according to an embodiment of the invention comprises a detection optical unit having an image sensor, which has a sensor surface formed from a plurality of sensor lines arranged parallel to one another, and a transport optical unit with a specimen-facing objective, which is provided both for specimen illumination by means of a light sheet tilted in relation to the optical axis of the transport optical unit and for imaging a specimen plane illuminated with the light sheet onto the sensor surface of the image sensor. In doing so, the optical axis of the detection optical unit is tilted relative to the optical axis of the transport optical unit. The sensor lines each extend in an orthogonal direction relative to the optical axis of the transport optical unit. The detection optical unit has an anamorphic magnification system, the magnification of which, in a direction perpendicular to the sensor lines of the image sensor, is less than in a direction parallel to the sensor lines.

An embodiment of the invention is, first, based upon the finding that asymmetry inevitably occurs in the imaging of the specimen plane, which is illuminated with the light sheet, onto the image sensor as a result of the optical axes of the transport optical unit and detection optical unit being tilted relative to each other. The embodiment of the invention takes into account this circumstance in that the sensor lines of the image sensor arranged at a tilt relative to the optical axis of the transport optical unit are arranged, in their longitudinal extension, orthogonally to the optical axis of the transport optical unit. In the present context, the aforementioned orthogonality between the optical axis of the transport optical unit and the respective sensor line is to be understood in the sense of an orthogonality of direction vectors, which involves a skewed position of these direction vectors in space.

An embodiment of the invention also utilizes the fact that, in today's image sensors, the duration of the readout process essentially depends solely upon the number of read sensor lines, but not upon the number of sensor columns perpendicular thereto. This readout process asymmetry inherent to the image sensor is then related, according to the invention, to that asymmetry which results from the tilting of the optical axes of the detection optical unit and the transport optical unit with respect to the imaging of the specimen plane onto the sensor surface of the image sensor. Specifically, departing from known solutions which operate with spherically symmetrical detection optical units, this is realized in that the detection optical unit contains an anamorphic magnification system, the magnification of which, in a direction lying orthogonal to the sensor lines of the image sensor, is less than in a direction parallel to the sensor lines. As a result, the number of sensor lines to be read is reduced, and thereby the image acquisition is accelerated.

Accordingly, an embodiment of the invention offers the particular advantage that significantly fewer pixels have to be read out in the direction orthogonal to the sensor lines, in which the resolution is reduced anyway as a result of the previously explained asymmetry of the imaging, and thus significantly fewer image signals have to be digitized.

The digitization of volumetric data may take place, for example, by scanning along the optical axis or perpendicular to the optical axis of the transport optical unit. The use of the anamorphic magnification system then means that now, instead of two different sampling rates, of which one relates to volumetric scanning and the other to the two scans in the detection plane, three different sampling rates are used. This can be taken into account in a suitable reconstruction, e.g., a so-called extraction of the data.

The image sensor is preferably an sCMOS sensor. As already mentioned at the outset, such a sensor is characterized, in particular, by high resolution, high frame rate, low readout noise, and high dynamics.

The anamorphic magnification system according to the invention is, for example, a tube lens system, a prism system, or a telescopic system of reflective or refractive type.

In a particular embodiment, the anamorphic magnification system is part of a changing device that includes several magnification systems selectively insertable into the detection optical unit. By providing several magnification systems which can be exchanged manually or by motor, different anamorphic magnification ratios can be realized. In particular, the changing device may also comprise a system, whose magnifications, orthogonal and parallel to the sensor lines, are equal, in order to operate the oblique plane microscope with a customary, spherically-symmetrical detection optical unit.

The oblique plane microscope preferably has an illumination optical unit for generating the light sheet in an intermediate image space, wherein the transport optical unit is telecentric on both sides, and the light sheet generated in the intermediate image space is imaged into the specimen, and the specimen plane illuminated with the light sheet is imaged into the intermediate image space as an intermediate image. The detection optical unit then images the intermediate image generated in the intermediate image space onto the image sensor. In this embodiment, the optical axes of the illumination optical unit, the transport optical unit, and the detection optical unit intersect each other in the intermediate image space.

In the aforementioned embodiment, the transport optical unit represents an intermediate imaging system, which has the properties required for volumetric imaging, viz., a magnification which corresponds to the refractive index ratio between the specimen space and the intermediate image space, in order to ensure correct depiction of the aperture angles, and also telecentricity on both sides, i.e., both the object side and image side, and thus a lateral magnification which is independent of the position along the optical axis. The use of a double-sided telecentric transport optical unit has the advantage over conventional microscopes, the intermediate imaging optical units of which are generally not telecentric on both sides, that, inter alia, no distortions are caused in the transport optical unit.

The oblique plane microscope preferably has a scanning element arranged in the transport optical unit, through which scanning element the light sheet in the specimen can be moved transversely to the optical axis of the transport optical unit. This scanning element enables lateral scanning, which facilitates volumetric imaging. This embodiment has the advantage of vibration-free image acquisition—in particular, in comparison with conventional light sheet microscopes in which, for volumetric image acquisition, an objective or the specimen, and thus a comparatively large mass, is moved along the optical axis. In addition, a higher volumetric frame rate can be achieved.

Said scanning element is, for example, a mirror galvanometer or a micro-electromechanical mirror, known as an MEMS mirror for short. In this embodiment, the illumination optical unit, the transport optical unit, and the detection optical unit are matched to one another such that their optical axes converge in the intermediate image space, i.e., intersect each other. The illumination light is thus coupled in, in the area of the intermediate image generated in the intermediate image space. This makes it possible to dispense with dichroic elements in the area of the transport optical unit which are used in known fluorescence microscopes for combining or separating illumination light and detection light. Since, on one hand, such dichroic elements generate a significant pupil offset and, on the other, the transport optical unit is relatively sensitive compared to such a pupil offset, the elimination of dichroic elements promotes the precise transport of the volumetric image between the specimen space and the intermediate image space. For example, highly accurate change designs for dichroic beam splitters, which enable the adaptation of the beam splitter to the respective experiment and which are only complex and expensive to realize with the required precision, can be dispensed with. Furthermore, the use of dichroic beam splitters also for multi-wavelength images is fraught with compromise. In this case, for example, spectral channel crosstalk frequently occurs. In contrast, the use of neutral splitters and polarization splitters is not suitable for fluorescence imaging. By means of the geometric combination of illumination light and emission light in the region of the intermediate image at the interface of the optical axes of the illumination optical unit, transport optical unit, and detection optical unit, and the possible dispensing with dichroic elements in the transport beam path through this combination, the previously explained disadvantages are avoided. Thus, the aforementioned embodiment provides for the light sheet to be produced in the intermediate image space by means of the illumination optical unit. The function of the detection optical unit is to image the intermediate image generated in the intermediate image space onto the image sensor. Thus, the illumination optical unit and the detection optical unit per se already form a microscope unit, the beam paths of which have to be transported through the transport optical unit, as it were, only into the specimen. In other words, this microscope unit can already be regarded as an independent light sheet microscope, which is to be coupled only to the transport optical unit. Thus, the arrangement is less tolerance- and adjustment-sensitive than systems which operate with beam splitters or the like in order to first assemble the subsystems into a fully-functional microscope. This is all the more true when differences in the aberrations frequently occur in the above-mentioned subsystems, which differences have to be compensated for by suitable provisions, or even tolerated.

For the reasons discussed above, the transport optical unit is free of a beam splitter in a preferred embodiment. In particular, it has no dichroic beam splitter for coupling the illumination light.

Preferably, the scanning element is arranged within the transport optical unit at the site of a real pupil image, i.e., arranged in the Fourier plane. As a double-sided telecentric system, the transport optical unit has only a single pupil. The illumination optical unit preferably contains a telescopic system and an illumination objective facing the intermediate image.

A laser light source is preferably used as the light source, but the light source can also be a light-emitting diode or a lamp. When using a laser light source, no excitation filter is required in the beam path of the illumination optical unit. In contrast, if a light source with a broad emission spectrum is used, such a filter may be required. The illumination optical unit preferably contains an anamorphic optical system for generating the light sheet. This anamorphic system can be implemented by a cylindrical lens alone or in combination with an illumination objective downstream thereof.

In an alternative embodiment, the illumination optical unit contains another scanning element, e.g., in the form of a mirror galvanometer or an MEMS mirror, for generating the light sheet. In this embodiment, the light sheet is sequentially constructed by the scanning movement of the illumination light beam striking the scanning element. This type of light beam generation offers, for example, the possibility of achieving a structuring of the light sheet by means of a corresponding synchronization between the light source and the scanning element.

In the above-mentioned embodiments, the oblique plane microscope is embodied as a scanning microscope, i.e., as a microscope which moves the light sheet within the specimen by means of a correspondingly actuated scanning element in order to enable volumetric imaging. However, the invention is not limited to such a scanning oblique plane microscope. For example, the volumetric imaging can also be realized in that the specimen-facing objective or the objective facing the intermediate image space is shifted along the optical axis of the transport optical unit.

FIG. 1 schematically shows the configuration of a light sheet microscope designated, in general, by 10, which is used for volumetric imaging in the manner of an oblique plane microscope.

The oblique plane microscope 10 comprises an illumination optical unit 12, a transport optical unit 14, and a detection optical unit 16, the optical axes $O_1$, $O_2$, and $O_3$ of which converge, i.e., intersect one another, in an intermediate image space designated as 18 in FIG. 1. The illumination optical unit 12 serves to focus the illumination light 22 supplied thereto by a light source 20 into the intermediate image space 18 in such a way that an illumination light distribution is generated there in the manner of a light sheet. This light sheet generated in the intermediate image space 18 is then imaged by the transport optical unit 14 into a specimen 19 such that a plane of the specimen 19 is illuminated with the light sheet and excited to emit fluorescence radiation. The light sheet or the specimen plane illuminated with the light sheet is shown purely schematically in FIG. 1 and designated therein by 21 and 23. The fluorescence radiation emitted by the specimen 19 in turn reaches the transport optical unit 14, which thus depicts the specimen plane 23 illuminated with the light sheet 21 as an intermediate image in the intermediate image space 18. The intermediate image, which is generated in the intermediate image space 18, of the illuminated specimen plane 23 is finally imaged by the detection optical unit 16 onto a sensor surface 28 of an image sensor 30.

In the propagation direction of the illumination light 22 emitted by the light source 20, the illumination optical unit 12 contains, successively, a cylindrical lens 32, a first adjusting element 34, an ocular lens system 36, a second adjusting element 38, a tube lens element 40, and an illumination objective 42 facing the intermediate image space 18. In the exemplary embodiment according to FIG. 1, the cylindrical lens 32 and the illumination objective 42 are part of an anamorphic optical system, which has the function of generating, from the illumination light 22 emitted by the light source 20, the light sheet in the desired shape in the intermediate image space 18. In doing so, the cylindrical lens 32 focuses the illumination light 22 into the image of the pupil of the illumination objective 42, said image being generated by the ocular lens system 36 and the tube lens system 40. In the exemplary embodiment according to FIG. 1, the tube lens system 40 and the ocular lens system 36 thus form a Kepler telescope with a real intermediate image. However, it should be pointed out that the implementation of the anamorphic system selected in the embodiment according to FIG. 1 is to be understood as purely exemplary. For example—in particular, with smaller numerical apertures—it is also possible to use the cylindrical lens 32 alone for shaping the light sheet, while omitting the illumination objective 42.

The two adjustment elements, 34 and 38, contained in the illumination optical unit 12 form an adjustment device which makes it possible to adjust the light sheet 21 relative to the sensor surface 28 of the image sensor 30—more precisely, relative to the image of the sensor surface 28 generated by the detection optical unit 16 in the intermediate image space 18, over which image the light sheet 21 is superimposed. In doing so, the adjustment element 38 is arranged in or close to a plane which is conjugate to an image plane of the illumination objective 42. Accordingly, the angle at which the illumination light 22 emerges from the illumination objective 42 is changed by tilting the adjustment element 38. The adjustment element 34 is arranged in or close to a plane which is conjugate to the pupil plane of the illumination objective 42. The position, primarily, of the illumination light 22 exiting from the illumination objective 42 can thus be adjusted via the adjustment element 34. The two adjustment elements, 34 and 38, thus allow the position and angle of the light sheet to be adjusted independently of one another.

The illumination optical unit 12 may, for generating the light sheet, contain other elements, e.g., a field stop and/an aperture stop. In this case, the field stop has the function of limiting the light sheet in the direction in which it is extended. By contrast, the aperture stop serves to limit the aperture angle with which the light sheet is focused.

The transport optical unit 14 contains an objective 44 facing the specimen 19, a tube lens system 46, an ocular lens system 48, a scanning element 50, an ocular lens system 52, a tube lens system 54, a deflection element 26, an afocal system 58, and an intermediate imaging objective 56 in this sequence, viewed from the object. The objective 44 here forms the sole specimen-facing objective of the oblique plane microscope 10.

The transport optical unit 14 in the present exemplary embodiment is implemented as a double-sided telecentric optical system. The afocal system 58 contained in the transport optical unit 14 serves to produce the magnification adaptation, which is required for the desired volumetric image transport, to the refractive index ratio between the specimen space and the intermediate image space 18.

The scanning element 50, which is implemented, for example, as a mirror galvanometer or MEMS mirror, makes it possible to scan the specimen 19 laterally, i.e., transverse to the optical axis of the objective 44, with the light sheet. For this purpose, the scanning element 50 is arranged between the two ocular lens systems, 48 and 52, at a position at which a real image of the pupil of the transport optical unit 14 is generated with the assistance of the ocular lens systems, 48 and 52.

Figure 3:
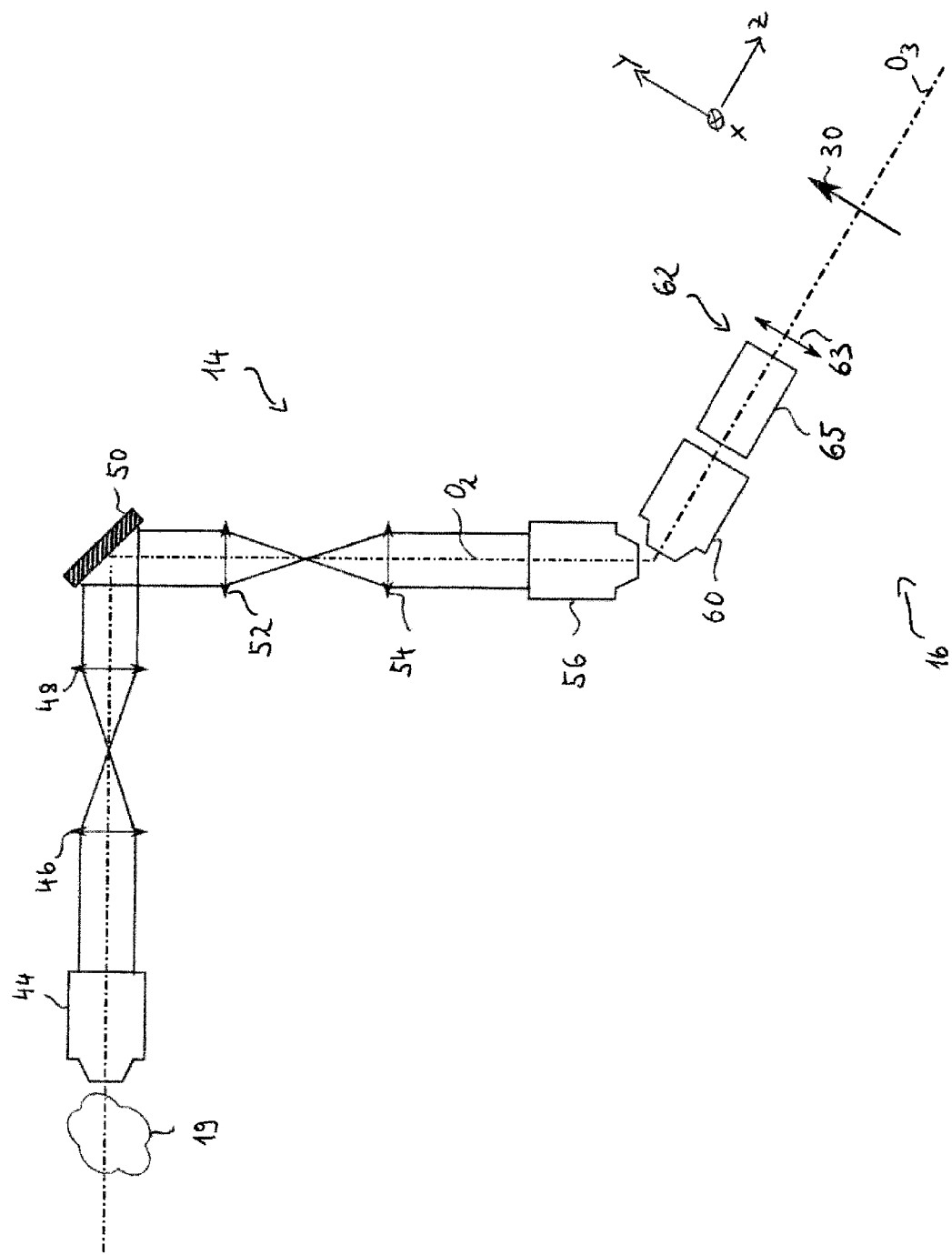
FIG. 3 shows a representation of the oblique plane microscope when the illumination optical unit is omitted.

The detection optical unit 16 contains a detection objective 60, facing the intermediate image space 18, and a functional unit 62, described in more detail below, which comprises a tube lens system 63 and an anamorphic magnification system 65 (cf. FIG. 3). By means of the detection objective 60 and the functional unit 62, the intermediate image, which is generated by the transport optical unit 14 in the intermediate image space, of the specimen plane 23, which is illuminated by the light sheet 21, is imaged onto the sensor surface 28 of the image sensor 30.

The oblique plane microscope 10 further has a control unit 64 which controls the light source 20, the image sensor 30, and the scanning element 50. In particular, the control unit 64 ensures that the light source 20, the image sensor 30, and the scanning element 50 are operated in synchrony with one another. For example, the control unit 64 ensures that the tilting of the scanning element 50, and thus the lateral scanning movement of the light sheet 21, is synchronized with the image acquisition of the image sensor 30. The light source 20 can, with the assistance of the control unit 64, also be operated in a synchronized manner, e.g., in such a way that the illumination light is switched off during a reset movement of the scanning element 50 and/or during a readout time of the image sensor 30. These synchronizing control processes are, of course, only to be understood as examples.

Since, in the oblique plane microscope 10 according to FIG. 1, the illumination optical unit 12, the transport optical unit 14, and the detection optical unit 16 are aligned in such a way that their optical axes $O_1$, $O_2$, and/or $O_3$ converge in the intermediate image 18, the coupling of the illumination light 22 generated by the light source 20 into the transport optical unit 14 takes place, so to speak, by means of a geometric combination in the area of the intermediate image, which means that dichroic beam-splitting elements can be dispensed with in the area of the transport optical unit 14. A pupil offset which affects the imaging performance of the transport optical unit 14 may thus be reliably avoided.

Figure 2:
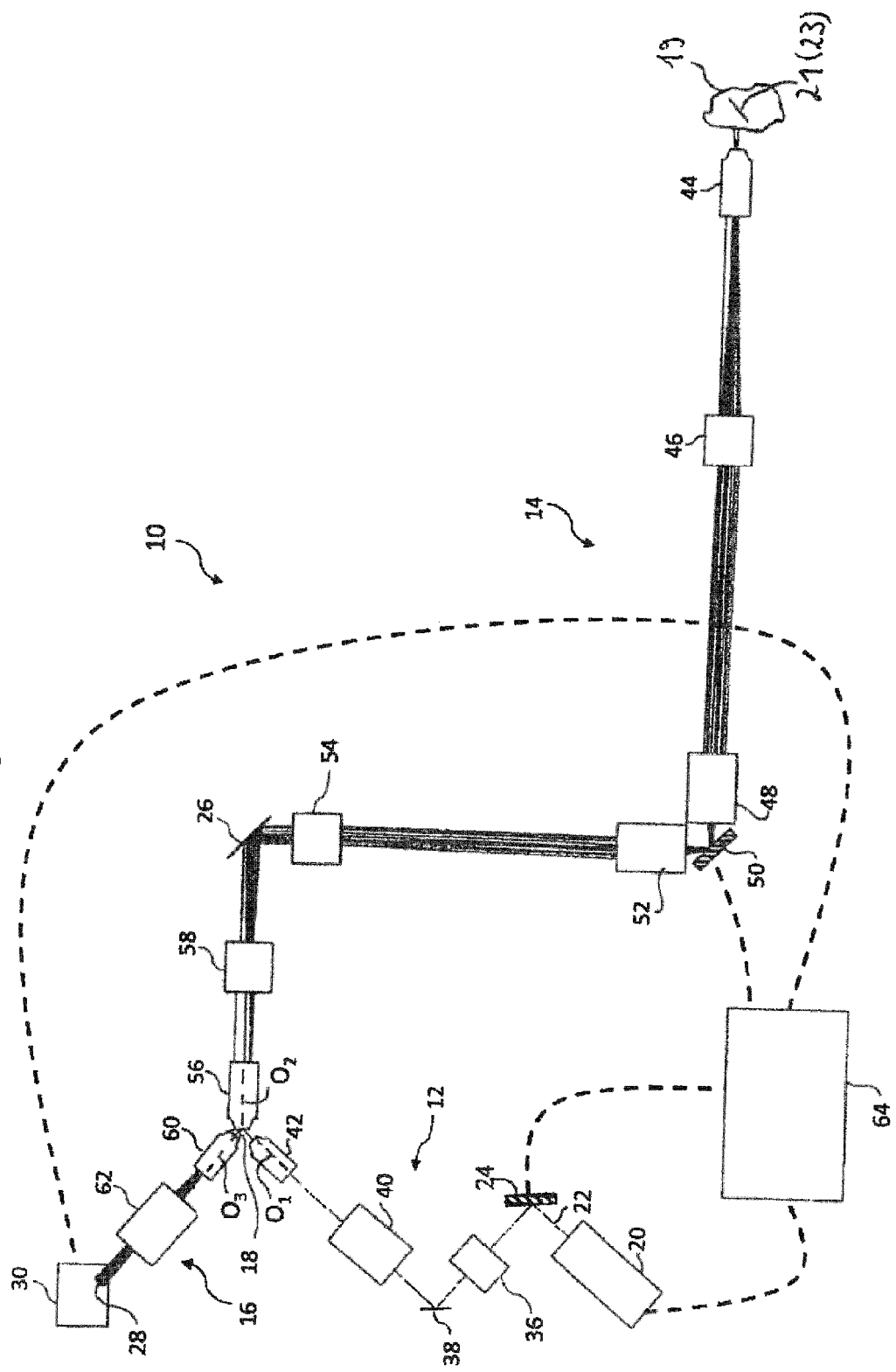
FIG. 2 shows a modified embodiment of the oblique plane microscope.

In FIG. 2, a modification of the oblique plane microscope 10 shown in FIG. 1 is shown as a second exemplary embodiment. This modification consists solely in that, instead of the cylindrical lens 32 which serves to generate the light sheet 21 in the first exemplary embodiment, a further scanning element 24 is provided in the illumination optical unit 12. The scanning element 24, which is, for example, a mirror galvanometer or an MEMS mirror, is arranged in the illumination optical unit 12 at the location at which the adjusting element 34 is located in the first exemplary embodiment. The scanning element 24 effects a scanning movement of the illumination light, by means of which the desired light sheet 21 is constructed sequentially. In doing so, the control unit 64 ensures, in turn, that the operation of the scanning element 24 is synchronized with the other system components—especially, the scanning element 50 and the image sensor 30 contained in the transport optical unit 14.

To illustrate how the functional unit generally indicated with 62 in FIGS. 1 and 2 interacts with the image sensor 30 in a manner according to the invention, FIG. 3 again shows the detection optical unit 16 and the transport optical unit 14 of the oblique plane microscope 10 when the illumination optical unit 12 is omitted. For ease of illustration, in FIG. 3, the afocal system 58 contained in the transport optical unit 14 is omitted.

Figure 4:
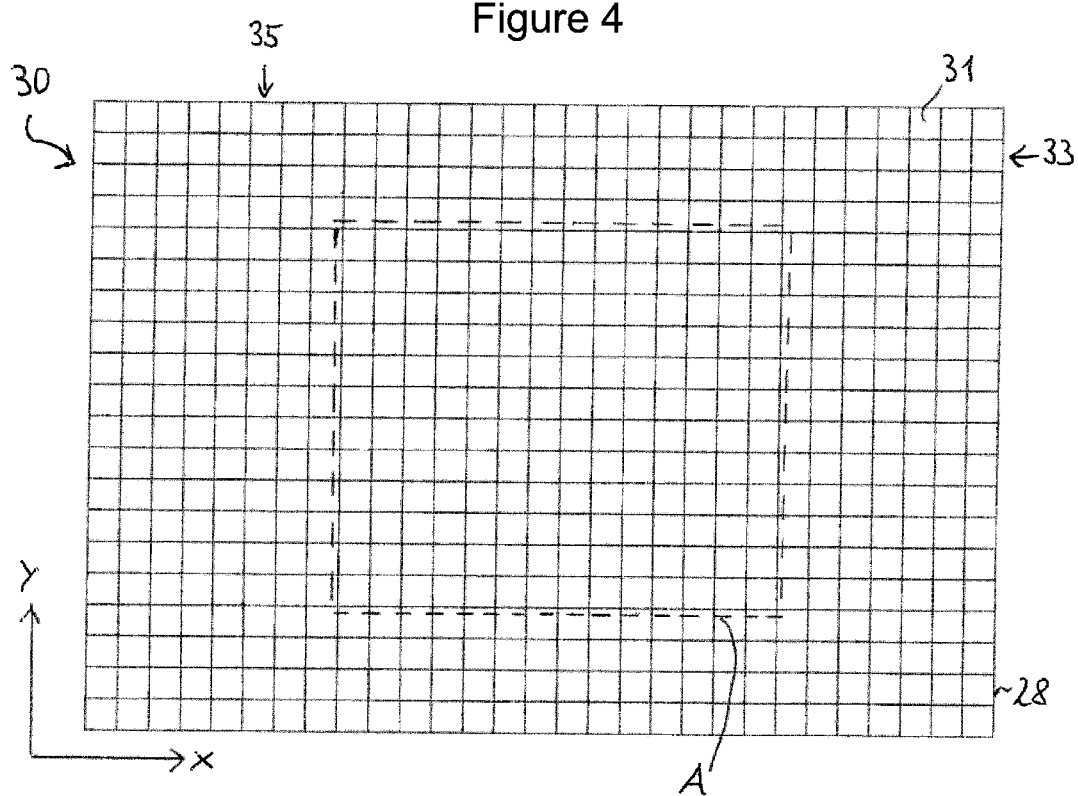
FIG. 4 shows a schematic illustration indicating the image generation on the image sensor without using an anamorphic magnification system.
Figure 5:
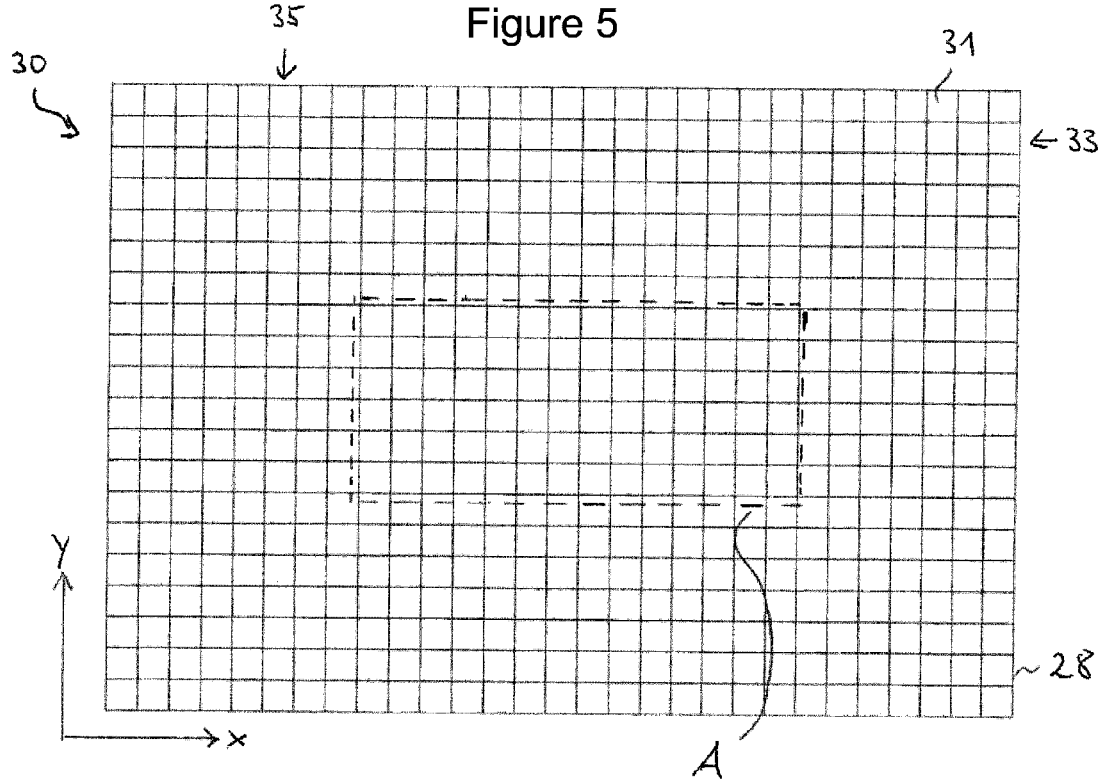
FIG. 5 shows a schematic illustration indicating the image generation on the image sensor using an anamorphic magnification system.

The image sensor 30 contained in the detection optical unit 16 in the present embodiment is an sCMOS sensor, the sensor surface 28 of which is formed from an array of pixels 31 (cf. FIGS. 4 and 5). With reference to the coordinate system shown in FIGS. 3 through 5, this array contains several sensor lines 33 each extending in the x-axis direction, and several sensor columns 35 each extending in the y-axis direction. As the sCMOS sensor, the image sensor 30 has the property that the time required to read the image signals generated in the image sensor 30 substantially depends solely upon the number of sensor lines 33, but not upon the number of sensor columns 35.

Taking into account the fact that the optical axis $O_3$ of the detection optical unit is tilted with respect to the optical axis $O_2$ of the transport optical unit 14, and thus the sensor surface 28 of the image sensor 30 is tilted with respect to the optical axis $O_2$ of the transport optical unit, the orientation of the sensor lines 33 is thereby selected in such a manner that the sensor lines 33 are orthogonal to the optical axis $O_2$ of the transport optical unit 14. This means that the sensor lines 33 in their respective longitudinal extension have no component along the optical axis $O_2$ of the transport optical unit 14.

In contrast, the sensor columns 35 of the image sensor 30, which are oriented along the y-axis, each have, in their longitudinal extension, a component along the optical axis $O_2$ of the transport optical unit 14. This component caused by the inclination of the detection optical unit 16 relative to the transport optical unit 14 may mean that the transport optical unit 14 is not able to illuminate the full aperture of the detection optical unit 16 in the direction of the y-axis, resulting in a reduced resolution in the direction of the y-axis. In addition, as a result of this inclination, a spherical aberration occurring in the transport optical unit 14, which is caused, for example, by a specimen-induced refractive index mismatch, may manifest itself, in the image generated on the camera sensor 30, as a comatic aberration in the direction of the y-axis. This leads to a further reduction in the resolution in the direction of the y-axis.

The circumstances explained above which negatively influence the imaging per se are now used in the present invention, by means of the anamorphic magnification system 65 contained in the functional unit 62, to reduce the number of sensor lines 33 of the image sensor 30 to be read out, whereby the readout rate of the image sensor 30 can be increased. However, even without the aforementioned influences on the imaging, an increase in the readout rate may be desirable in application, wherein the reduced sampling rate of the digitization of the image is accepted by the sensor 30. Thus, the anamorphic magnification system 65 is designed such that its magnification in the y-axis direction is less than it is in the direction of the x-axis.

The effect of the anamorphic magnification system 65 is illustrated in FIGS. 4 and 5. FIG. 4 shows, purely by way of example, an image A which is generated on the sensor surface 28 of the image sensor 30, without the assistance of the anamorphic magnification system 65. In the example of FIG. 4, the image A extends over twelve sensor lines 33 in total.

In contrast, FIG. 5 shows the corresponding image when using the anamorphic magnification system 65. In the example shown, the anamorphic magnification system 65 ensures that the image A produced on the sensor surface 28 of the image sensor 30 extends only over six sensor lines 33 along the y-axis. Consequently, the number of sensor lines 33 to be read out has decreased in the direction in which the resolution may be reduced anyway as a result of the mutually-tilted optical axes of the transport optical unit 14 and the detection optical unit 16.

Figure 6:
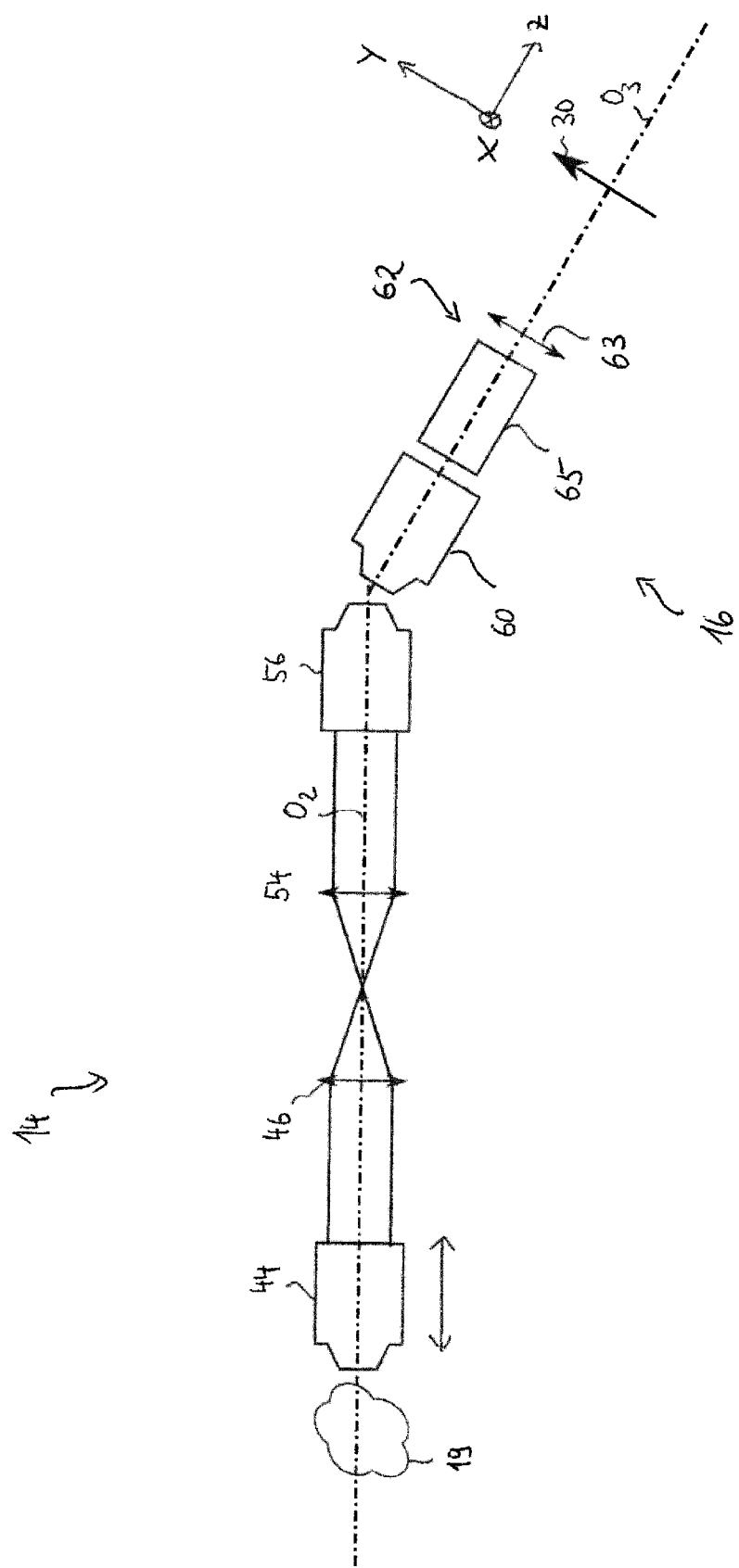
FIG. 6 shows a modified embodiment of the oblique plane microscope having a displaceable objective instead of a scanning element.

The oblique plane microscope 10 shown in FIGS. 1 and 2 has the scanning element 50 which serves to scan the specimen 19 laterally, i.e., transverse to the optical axis of the objective 44, with the light sheet 21. However, the oblique plane microscope 10 is not limited to such an embodiment. FIG. 6 thus shows an arrangement which corresponds to the arrangement shown in FIG. 3, but without the scanning element 50 and, consequently, also without the two ocular lens systems 48, 52. In order to enable scanning of the specimen 19 with the light sheet 21, and thus volumetric imaging, in the arrangement according to FIG. 6, the specimen-facing objective 44 can be shifted along the optical axis $O_2$. An offset of the objective 56 facing the intermediate image space is, however, also conceivable.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

10 Light sheet microscope
12 Illumination optical unit
14 Transport optical unit
16 Detection optical unit
18 Intermediate image space
19 Specimen
20 Light source
21 Light sheet
22 Illumination light
23 Specimen plane
24 Scanning element
26 Deflection element
28 Sensor surface
30 Image sensor
31 Pixels
32 Cylindrical lens
33 Sensor lines
34 Adjustment element
35 Sensor columns
36 Ocular lens system 38 Adjustment element
40 Tube lens system
42 Illumination objective
44 Specimen-facing objective
46 Tube lens system
48 Ocular lens system
50 Scanning element
52 Ocular lens system
54 Tube lens system
56 Intermediate imaging objective
58 Afocal system
60 Detection objective
62 Functional unit
63 Tube lens system
64 Control unit
65 Anamorphic magnification system
66 Image rotation unit
$O_1$ Optical axis of the illumination optical unit
$O_2$ Optical axis of the transport optical unit
$O_3$ Optical axis of the detection optical unit

The invention claimed is:

1. An oblique plane microscope, comprising:
a detection optical unit having an image sensor which has a sensor surface formed from a plurality of sensor lines arranged parallel to one another, and
a transport optical unit having a specimen-facing objective which is arranged both for specimen illumination by a light sheet tilted relative to an optical axis of the transport optical unit and for imaging a two-dimensional area of a specimen plane illuminated with the light sheet onto the sensor surface of the image sensor,
wherein an optical axis of the detection optical unit is tilted with respect to the optical axis of the transport optical unit,
wherein the sensor lines each extend in an orthogonal direction with respect to the optical axis of the transport optical unit, and
wherein the detection optical unit has an anamorphic magnification system, a magnification of the anamorphic magnification system, in a direction lying orthogonal to the sensor lines of the image sensor, being less than a magnification of the anamorphic magnification system in a direction lying parallel to the sensor lines of the image sensor.

2. The oblique plane microscope according to claim 1, wherein the image sensor comprises an sCMOS sensor.

3. The oblique plane microscope according to claim 1, wherein the anamorphic magnification system comprises a tube lens system.

4. The oblique plane microscope according to claim 1, wherein the anamorphic magnification system comprises a telescopic system.

5. The oblique plane microscope according to claim 1, wherein the anamorphic magnification system comprises a prism system.

6. The oblique plane microscope according to claim 1, wherein the anamorphic magnification system is part of a changing device, which comprises multiple magnification systems which are selectively insertable into the detection optical unit.

7. The oblique plane microscope according to claim 1, wherein the transport optical unit is telecentric on both sides, the oblique plane microscope further comprising an illumination optical unit arranged to produce the light sheet in an intermediate image space such that the light sheet produced in the intermediate image space is imaged into the specimen, the specimen plane illuminated with the light sheet is imaged as an intermediate image into the intermediate image space, and the detection optical unit images the intermediate image generated in the intermediate image space onto the image sensor, and wherein an optical axis of the illumination optical unit and the optical axes of the transport optical unit, and of the detection optical unit intersect one another in the intermediate image space.

8. The oblique plane microscope according to claim 7, further comprising a scanning element arranged in the transport optical unit, through which scanning element the light sheet in the specimen is moveable transversely to the optical axis of the transport optical unit.

9. The oblique plane microscope according to claim 8, wherein the scanning element is arranged within the transport optical unit at a site of a realistic pupil image.

10. The oblique plane microscope according to claim 7, wherein the transport optical unit is free of a beam splitter.

11. The oblique plane microscope according to claim 7, wherein the illumination optical unit contains a telescopic system and an illumination objective facing the intermediate image space.

12. The oblique plane microscope according to claim 7, wherein the illumination optical system contains an anamorphic system configured to generate the light sheet in the intermediate image space.

13. The oblique plane microscope according to claim 7, wherein the illumination optical system contains a further scanning element configured to generate the light sheet in the intermediate image space.

14. The oblique plane microscope according to claim 1, wherein the specimen-facing objective is shiftable along the optical axis of the transport optical unit.

* * * * *